(12) United States Patent
Nübling

(10) Patent No.: US 11,307,084 B2
(45) Date of Patent: Apr. 19, 2022

(54) OPTOELECTRONIC SENSOR COMPRISING AN OPTICAL FILTER ELEMENT ARRANGED WITHOUT A GAP BETWEEN FIRST AND SECOND PART LENSES OF AT LEAST ONE RECEPTION LENS

(71) Applicant: SICK AG, Waldkirch (DE)

(72) Inventor: Ralf Ulrich Nübling, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/308,014

(22) Filed: May 4, 2021

(65) Prior Publication Data
US 2021/0348964 A1    Nov. 11, 2021

(30) Foreign Application Priority Data
May 5, 2020    (DE) ...................... 10 2020 112 091.5

(51) Int. Cl.
*G02B 13/16*    (2006.01)
*G01J 1/04*    (2006.01)
*G01J 1/42*    (2006.01)

(52) U.S. Cl.
CPC ........... *G01J 1/0488* (2013.01); *G01J 1/0411* (2013.01); *G01J 1/42* (2013.01)

(58) Field of Classification Search
CPC .......... G01J 1/0407; G01J 1/0411; G01J 1/42; G02B 13/14; G02B 13/16; G02B 13/18; G02B 13/22; G02B 5/201; G02B 5/206; G02B 5/28
USPC .................................................. 250/216, 239
See application file for complete search history.

(56) References Cited

U.S. PATENT DOCUMENTS 6,677,568 B2 * 1/2004 Shirai .................... G01C 15/00
250/201.7

FOREIGN PATENT DOCUMENTS

| DE | 102014116852 A1 | 5/2016 |
| DE | 112018005066 T5 | 6/2020 |
| DE | 102019125429 B3 | 12/2020 |
| WO | 2019/054308 A1 | 3/2019 |

OTHER PUBLICATIONS

Examination Report dated Apr. 29, 2021 issued in corresponding German Application No. 102020112091.5.

* cited by examiner

*Primary Examiner* — Que Tan Le
(74) *Attorney, Agent, or Firm* — Nath, Goldberg & Meyer; Jerald L. Meyer

(57) ABSTRACT

An optoelectronic sensor having a reception element and at least one reception lens and an optical filter element, wherein the filter element is arranged without a gap between a first part lens and a second part lens, wherein the part lenses form one of the reception lenses or the reception lens, and wherein the optical filter element has at least one convex or concave shape and received light beams pass through the filter element at the same angle at every entry point or an optoelectronic sensor having a reception element and a reception lens and an optical filter element that is arranged between the reception element and the reception lens, wherein the optical filter element has at least one curved free-form surface so that the received light beams pass through the filter element at the surface of the optical filter element at the same angle at every entry point.

22 Claims, 6 Drawing Sheets

Figure 1:
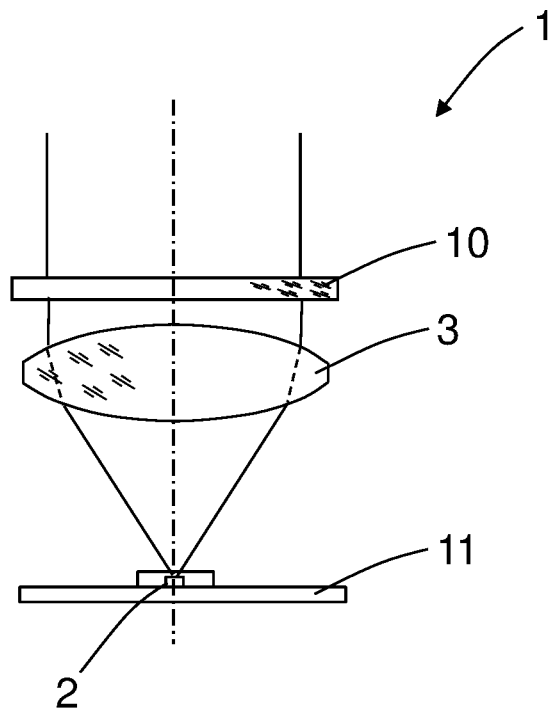

OPTOELECTRONIC SENSOR COMPRISING AN OPTICAL FILTER ELEMENT ARRANGED WITHOUT A GAP BETWEEN FIRST AND SECOND PART LENSES OF AT LEAST ONE RECEPTION LENS

The present invention relates to an optoelectronic sensor having a reception element and a reception lens in accordance with the preamble of the respective independent claim and to an optoelectronic sensor having a transmission element and a transmission lens in accordance with the preamble of the respective independent claim.

To achieve a detectivity and an interference resistance that is as high as possible in optoelectronic sensors, it is of advantage to position an extraneous light filter, in particular a bandpass filter, in front of the receiver that where possibly only allows the wavelength of the transmitted radiation to pass.

This comes up against limits in practice so that the filters have a greater transmission than desired. This is, on the one hand, due to tolerance effects such as a different transmission wavelength in the same series due to tolerances, temperature fluctuations, or production differences. A decisive reason is, however, also that the received radiation is not ideal due to an imaging at the reception side, i.e. all the radiation is not incident on the filter at the same angle (angle of incidence).

Due to the wide angular range of the incident radiation, the filter necessarily has to be designed as broad band, which results in high extraneous light portions. Alternatively, filters are applied to front screens since the optical radiation at the reception side is incident on the filter at relatively the same angle as a rule in front of the imaging optics. The filter can thereby be designed with a narrower band than in accordance with an optical imaging. The disadvantage of this is that a filter in front of the reception optics has a very large area and thereby causes high costs.

An object of the invention comprises improving a filter effect without increasing the costs of the filter unnecessarily and of increasing the size of the filter unnecessarily.

The object is satisfied by an optoelectronic sensor having a reception element and at least one reception lens and an optical filter element, wherein the filter element is arranged without a gap between a first part lens and a second part lens, wherein the part lenses form one of the reception lenses or the reception lens, and wherein the optical filter element has at least a convex or concave shape and received light beams pass through the filter element at the same angle at every entry point.

The object is further satisfied by an optoelectronic sensor having a transmission element and at least one transmission lens and an optical filter element, wherein the filter element is arranged without a gap between a first part lens and a second part lens, wherein the part lenses form one of the transmission lenses or the transmission lens, and wherein the optical filter element has at least a convex or concave shape and transmitted light beams pass through the filter element at the same angle at every entry point.

The invention provides configuring a surface of the filter such that it corresponds to the wavefront of the received radiation and/or the transmitted radiation. I.e. the angle of incidence of all the received radiation and/or transmitted radiation is almost the same.

In accordance with the invention, the reception lens and/or the transmission lens is/are divided into two lenses, namely the first part lens and the second part lens, and indeed exactly such that the separating layer corresponds to the wavefront, i.e. all the beams in the separating layer have the same angle of incidence where possible.

The part lenses and the filter element are pressed with one another, for example. Provision can, however, also be made that a surface of a part lens is coated and that this coating forms the filter element. The second part lens is then connected to the filter element of the first part lens so that in turn a gap-free connection is present.

Additional boundary surfaces with air or other media that can have a negative effect on the optical properties, such as additional refraction processes and direction changes of the optical radiation, for example, are removed by the gap-free connection between the part lenses and the filter.

An installation of the optoelectronic sensor is also simplified by the connection of the first part lens, second part lens, and optical filter element since only a single component has to be installed and adjusted.

The part lenses and the filter element can, for example, be connected without a gap by a transparent gel, a transparent cement, or similar.

The filter element can be a bandpass filter, a high pass filter a low pass filter, a splitter layer filter, a polarization filter, or similar.

An optimum configuration of the filter element with respect to extraneous light and/or interference light is thus possible. In accordance with the invention, for example, a narrow band property can be reduced by a variance of a previously considered angle of incidence of the incident radiation, whereby a better signal-to-noise ratio and a higher detectivity result.

The filter element can furthermore also be a mirror element or a diaphragm element.

The construction size and the costs, in particular the installation costs, are furthermore reduced.

The reception element is a reception diode, for example. The reception lens is located at a distance in front of the reception element. The reception lens is, for example, designed as a converging lens and bundles the light onto the reception element. The received light is here incident on the reception light in bundled form after the reception lens.

The transmission element is a transmission diode, for example. The transmission lens is located at a distance in front of the transmission element. The transmission lens is, for example, designed as a converging lens and bundles the light. The transmitted light here exits in bundled form after the transmission lens.

The object is furthermore satisfied by an optoelectronic sensor having at least one reception element and a reception lens and an optical filter element that is arranged between the reception element and the reception lens, wherein the optical filter element has at least one curved free-form surface so that the received light beams pass through the filter element at the surface of the optical filter element at a perpendicular angle at every entry point.

The invention provides configuring a free-form surface of the filter such that it corresponds to the wavefront of the received radiation. I.e. the angle of incidence of all the received radiation toward the filter layer surface is almost the same.

The object is furthermore satisfied by an optoelectronic sensor having a transmission element and a transmission lens and an optical filter element that is arranged between the transmission element and the transmission lens, wherein the optical filter element has at least one curved free-form surface so that the transmitted light beams pass through the filter element at the surface of the optical filter element at the same angle at every entry point.

The invention provides configuring a free-form surface of the filter such that it corresponds to the wavefront of the transmitted radiation. I.e. the angle of incidence of all the transmitted radiation toward the filter layer surface is almost the same.

In a further development of the invention, received light beams pass through the filter element at a perpendicular angle at every entry point. The efficiency of the filter is thereby optimized.

In a further development of the invention, the first part lens and the second part lens each have different refractive indices.

Optical properties or optical defects of the lenses can thus be mutually compensated or minimized.

This can, for example, have the advantage that the focal length of the lens combination or the light spot size resulting therefrom is temperature invariant for a predefined wavelength, i.e. it does not change with a change of temperature. Since, for example, the convex first part lens focuses the light more for lower temperatures and the subsequent concave second part lens correspondingly scatters the light, the focal length remains the same at two different temperatures. It follows from this that the size of the light spot on a receiver remains unchanged or the light is transmitted in unchanged form.

In a further development of the invention, the optoelectronic sensor is a sensor in accordance with the time of flight method. In this process, a brief light pulse or a group of light pulses is transmitted by the light transmitter. The light pulse or pulses is/are reflected or remitted by an object and is/are received by the reception element of the light receiver. The time of flight of the light from the transmission up to the reception is evaluated by an evaluation unit arranged downstream and the distance of the object is calculated from it.

In a further development of the invention, the optoelectronic sensor is a laser scanner, a safety laser scanner, a 3D camera, a stereo camera, or a time of flight camera.

The spatially resolving scanner, the laser scanner, the safety laser scanner, the 3D camera, the stereo camera, or the time of flight camera monitors a two-dimensional or a three-dimensional monitored zone for the position detection. It can synonymously be a monitored field.

A 3D camera, for example, likewise monitors a monitored zone by means of a plurality of detected distance values. A 3D camera has the advantage that a volume-like protected zone can be monitored.

A stereo camera, for example, likewise monitors a monitored zone by means of a plurality of detected distance values. The distance values are determined on the basis of the two cameras of the stereo camera that are installed at a basic spacing from one another. A stereo camera equally has the advantage that a volume-like protected zone can be monitored.

Distance values on the basis of the measured time of flight that are determined by an image sensor are determined by means of a time of flight camera. A time of flight camera equally has the advantage that a volume-like or spatial protected zone can be monitored.

In a further development, a first surface of the first part lens and a second surface of the second part lens each have a planar, convex, or concave surface.

Different lens shapes can thus be formed, in particular a converging lens, by the respective design of the part lenses. The optical beam shaping property of the reception lens is determined by the selection of the first and second part lenses. The areal shape of the filter element is formed by the separating surface between the first and second part lenses.

In a further development of the invention, the first part lens and/or the second part lens has/have a spherical surface.

A spherical surface is a part of a sphere. The filter element is here a rotationally symmetrical body that is associated with a rotationally symmetrical reception lens in accordance with this embodiment. In accordance with this embodiment, the light energy can be bundled onto a light spot that is as small as possible. This improves the sensor sensitivity and allows a higher distance accuracy with a triangulation sensor. The reception element is a reception diode with a small reception area, for example. The reception area is thus, for example, smaller than 1 $mm^2$.

In a further development, the filter element is composed of glass or plastic. Plastic can be processed more cheaply and plastic injection moldings can in particular be manufactured more simply. Glass is in particular suitable for the manufacture of high precision filter elements.

The first and/or second part lenses can also be produced from glass and/or plastic. Plastic can also be processed more cheaply for this purpose and plastic injection molded lenses can in particular be manufactured simply. Glass is in particular suitable for the manufacture of high precision reception elements.

In a further development of the invention, the filter element is itself an optical lens. The filter itself can thereby have a refractive optical property and effect a beam-shaping.

In a further development of the invention, the reception lens is a cylindrical lens and the filter element is a cylindrical body.

The reception element is here formed by a plurality of reception elements arranged in a row. A linear or a strip-shaped reception element can, however, also be arranged. Such an arrangement is of advantage, for example, with a barcode scanner or a light grid.

In a further development of the invention, the transmission lens is a cylindrical lens and the filter element is a cylindrical body.

The transmission element is here formed by a plurality of transmission elements arranged in a row. A linear or a strip-shaped transmission element can, however, also be arranged. Such an arrangement is of advantage, for example, with a barcode scanner or a light grid.

Figure 8:
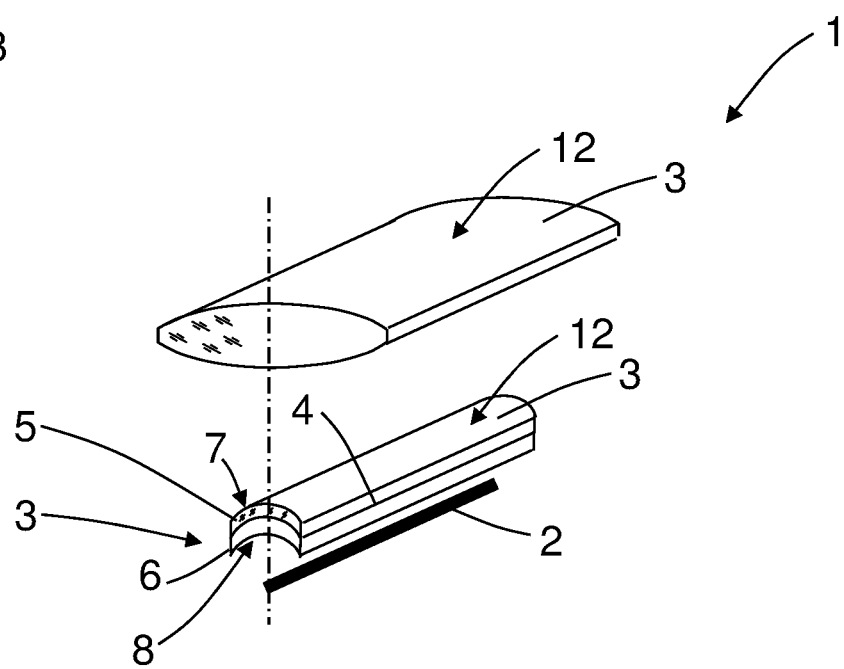
Figure 9:
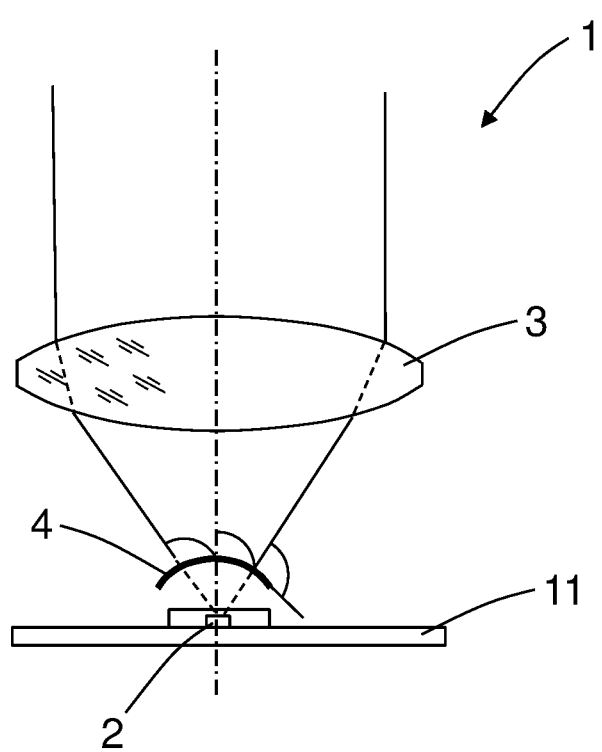

The invention will also be explained in the following with respect to further advantages and features with reference to the enclosed drawing and to embodiments. The Figures of the drawing show in:

FIG. 1 an optoelectronic sensor in accordance with the prior art;

FIGS. 2 to 7 respective embodiments of a sensor in accordance with the invention;

FIG. 8 a cylindrical lens and a filter element as cylindrical bodies;

FIG. 9 an optoelectronic sensor comprising a filter element having at least one curved free-form surface; and FIG. 10 an optoelectronic sensor having a transmission element and a transmission lens, In the following Figures, identical parts are provided with identical reference numerals.

FIG. 1 shows a part of an optoelectronic sensor in accordance with the prior art. In accordance with FIG. 1, a reception element 2 is arranged on a circuit board 11 or on a printed circuit board. A reception lens 3 is arranged spaced apart from the reception element 2. The reception element 2 is here arranged inside the focal length at the focal point of the reception lens 4. An optical filter 10 is arranged in front of the reception lens 4. Incident light therefore first passes through the filter 10, with unwanted light portions being filtered. The incident light is subsequently focused on the reception element 2 by the reception lens 3.

Figure 2:
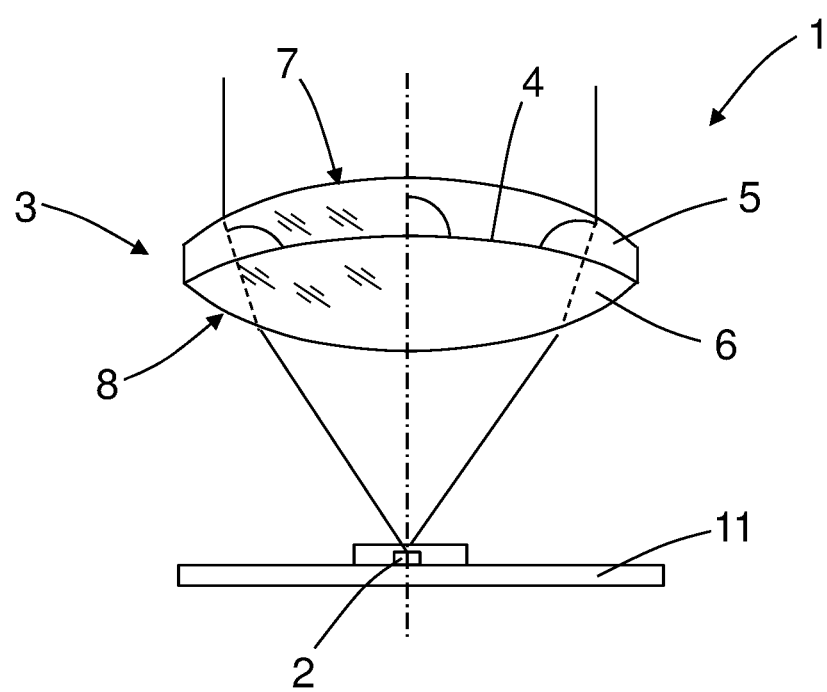

FIG. 2 shows an optoelectronic sensor 1 in accordance with the present invention having a reception element 2 and at least one reception lens 3 and an optical filter element 4, wherein the filter element 4 is arranged without a gap between a first part lens 5 and a second part lens 6, wherein the part lenses 5, 6 form one of the reception lenses 3 or the reception lens 3, and wherein the optical filter element 4 has at least a convex or concave shape and received light beams pass through the filter element 4 at the same angle at every entry point.

In accordance with FIG. 2 and the following Figures, a transmission element 13 can also be provided instead of the reception element 2, with a transmission lens 14 being provided instead of the reception lens 3.

Figure 10:
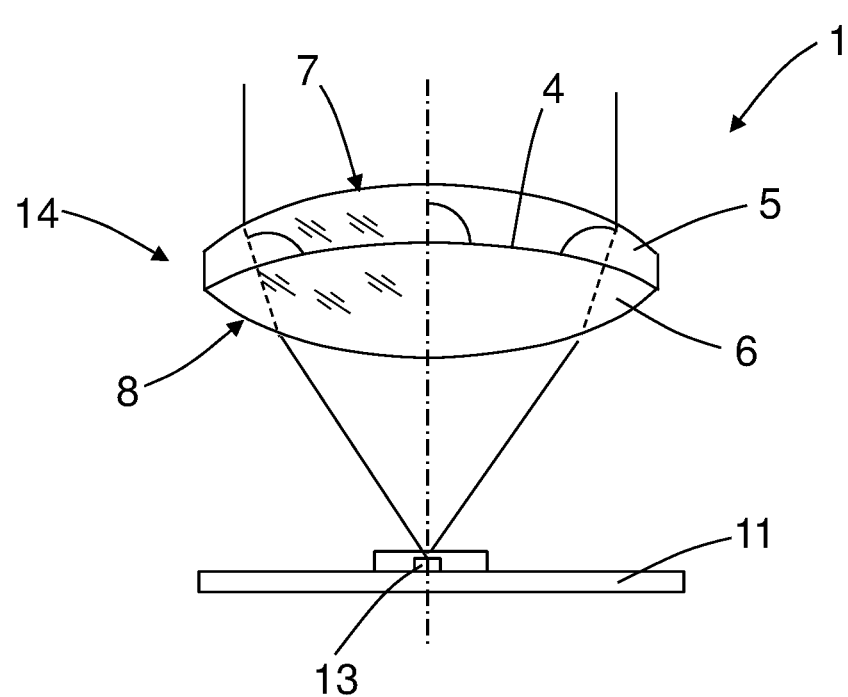

FIG. 10, for example, shows an optoelectronic sensor 1 comprising a transmission element 13 and at least one transmission lens 14 and an optical filter element 4, wherein the filter element 4 is arranged without a gap between a first part lens 5 and a second part lens 6, wherein the part lenses 5, 6 form one of the transmission lenses 14 or the transmission lens 14, and wherein the optical filter element 4 has at least a convex or concave shape and transmitted light beams pass through the filter element 4 at the same angle at every entry point.

In accordance with FIG. 2, a surface of the optical filter element 4 is configured such that this surface corresponds to the wavefront of the reception radiation. I.e. the angle of incidence of all the received radiation is almost the same.

In accordance with FIG. 2, the reception lens 3 is divided into two lenses, namely the first part lens 5 and the second part lens 6, and indeed exactly such that the separating layer corresponds to the wavefront, i.e. all the beams in the separating plane have the same angle of incidence where possible.

The part lenses 5 and 6 and the filter element 4 are pressed with one another, for example. Provision can, however, also be made that a surface of a part lens 5 or 6 is coated and that this coating forms the filter element 4. The second part lens 6 is then connected to the filter element 4 of the first part lens 5 so that in turn a gap-free connection is present.

Additional boundary surfaces with air or other media that can have a negative effect on the optical properties, such as additional refraction processes and direction changes of the optical radiation, for example, are removed by the gap-free connection between the part lenses 5 and 6 and the filter 4.

The part lenses 5 and the filter element 4 can, for example, be connected in a gap-free manner by a transparent gel, a transparent cement, or similar.

The filter element 4 can be a bandpass filter, a high pass filter a low pass filter, a splitter layer filter, a polarization filter, or similar. The filter element 4 can furthermore also be a mirror element or a diaphragm element.

The reception element 2 is a reception diode, for example. The reception lens 4 is located at a distance in front of the reception element 2. The reception lens 3 is, for example, designed as a converging lens and bundles the light onto the reception element 2. The received light is here incident on the reception element 2 in bundled form after the reception lens 3.

In accordance with an embodiment, the optoelectronic sensor 1 is a sensor in accordance with the time of flight method. In this process, a brief light pulse or a group of light pulses is transmitted by the light transmitter. The light pulse or pulses is/are reflected or remitted by an object and is/are received by the reception element 2 of the light receiver. The time of flight of the light from the transmission up to the reception is evaluated by an evaluation unit arranged downstream and the distance of the object is calculated from it.

In accordance with an embodiment, the optoelectronic sensor 1 is a laser scanner, a safety laser scanner, a 3D camera, a stereo camera, or a time of flight camera.

In accordance with FIGS. 2 to 7, a first surface 7 of the first part lens 5 and a second surface 8 of the second part lens 6 each have a planar, convex, or concave surface.

Different lens shapes can thus be formed, in particular a converging lens, by the respective design of the part lenses 5 and 6 The optical beam shaping property of the reception lens 3 is determined by the selection of the surfaces of the first part lens 5 and the second part lens 6. The areal shape of the filter element 4 is formed by the separating surface between the first part lens 5 and the second part lens 6.

In accordance with FIG. 2, the first part lens 5 and the second part lens 6 have a spherical surface. The first surface 7 is convex and the second surface 8 is likewise convex.

A spherical surface is a part of a sphere. The filter element 4 is here a rotationally symmetrical body that is associated with a rotationally symmetrical reception lens 3 in accordance with this embodiment. In accordance with this embodiment, the light energy can be bundled onto a light spot that is as small as possible. This improves the sensor sensitivity and allows a higher distance accuracy with a triangulation sensor. The reception element 2 is a reception diode with a small reception area, for example. The reception area is thus, for example, smaller than 1 $mm^2$.

In accordance with the Figures, the filter element 4 is composed of glass or plastic. The first and/or second part lenses 5, 6 can also be produced from glass and/or plastic.

Figure 3:
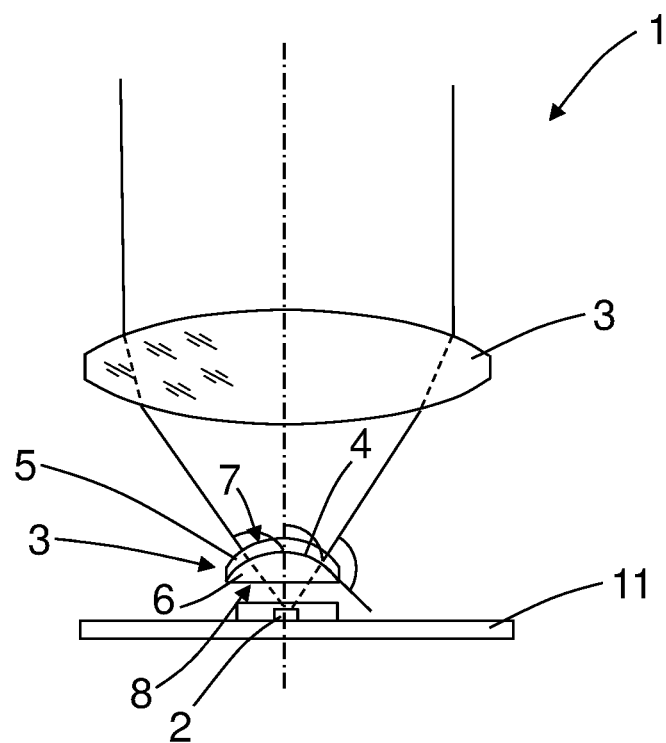

FIG. 3 shows an embodiment having a plurality of reception lenses 3. One reception lens 3 is a conventional reception lens and the other reception lens 3 has an integrated optical filter element 4. FIGS. 4 to 8 each show an embodiment having a plurality of reception lenses 3, in particular two. In accordance with FIG. 3, the first surface 7 is convex and the second surface 8 is planar.

Figure 4:
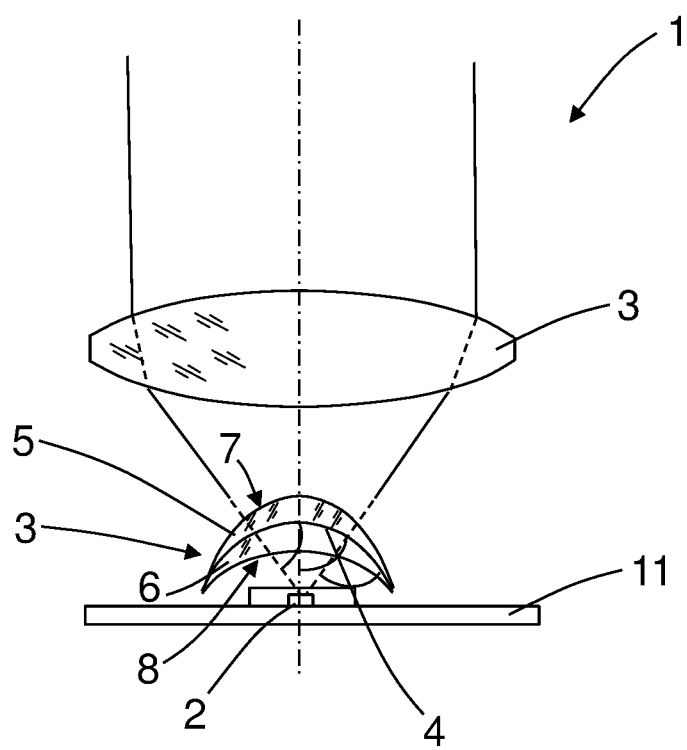

In accordance with FIG. 4, the first surface 7 is convex and the second surface 8 is concave.

Figure 5:
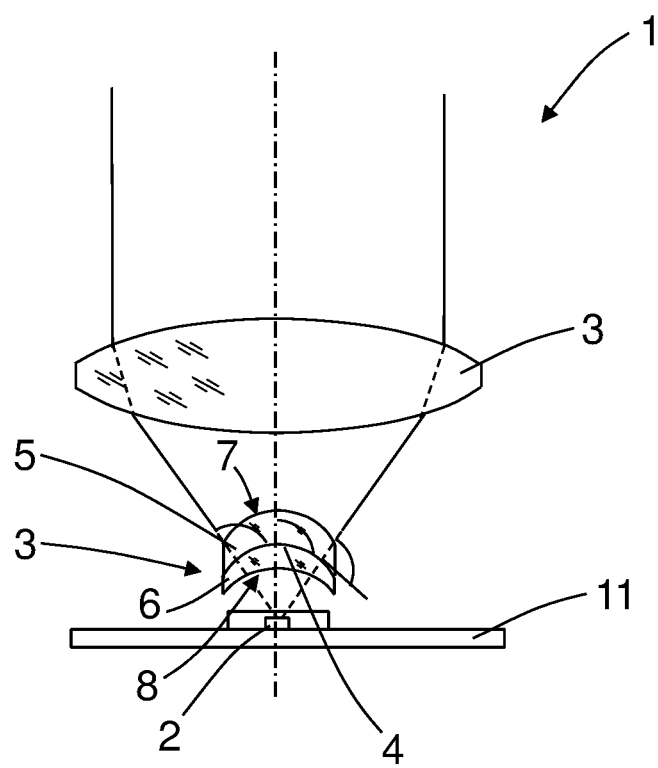

In accordance with FIG. 5, the first surface 7 is convex and the second surface 8 is concave, with the margins of the part lenses 5, 6 being cut.

Figure 6:
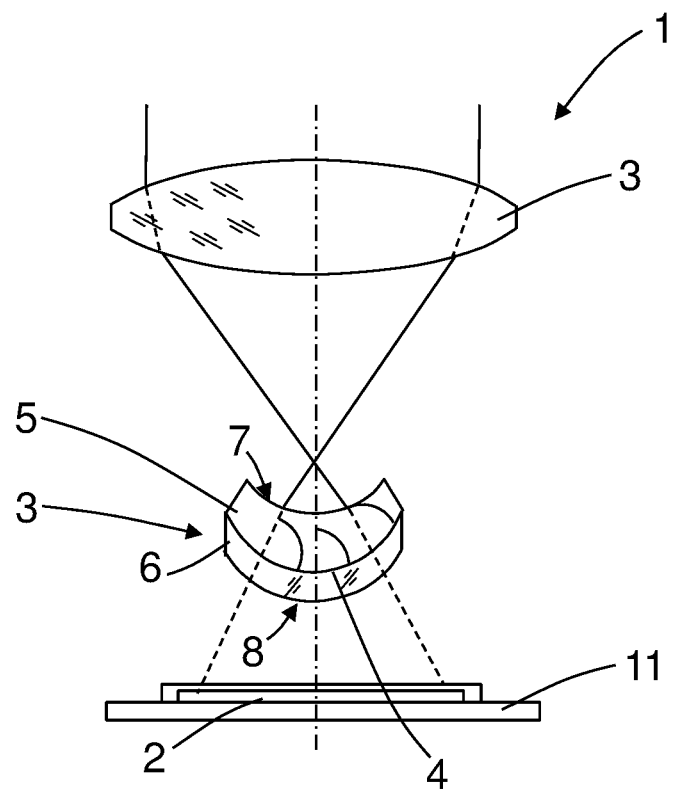

In accordance with FIG. 6, the first surface 7 is concave and the second surface 8 is convex. The optical filter element 4 is arranged after a focal point of the reception lens 3 in the direction of the received beam. The reception element 2 is formed by an image sensor.

Figure 7:
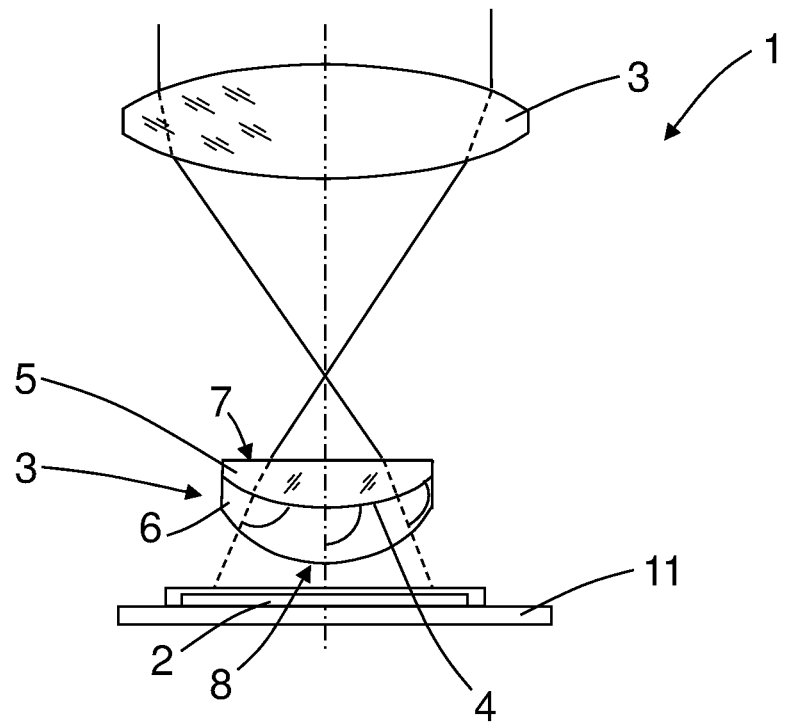

In accordance with FIG. 7, the first surface 7 is planar and the second surface 8 is convex, with the margins of the part lenses 5, 6 being cut.

In accordance with FIG. 8, the reception lens is a cylindrical lens 12 and the filter element 4 is a cylindrical body.

The reception element 2 is here formed by a plurality of reception elements 2 arranged in a row. A linear or a strip-shaped reception element 2 can, however, also be arranged. Such an arrangement is of advantage, for example, with a barcode scanner or a light grid.

FIG. 9 shows an optoelectronic sensor 1 having at least one reception element 2 and a reception lens 3 and an optical filter element 4 that is arranged between the reception element 2 and the reception lens 3, wherein the optical filter element 4 has at least one curved free-form surface so that the received light beams pass through the filter element 4 at the surface of the optical filter element 4 at a perpendicular angle at every entry point.

FIG. 9 provides configuring a free-form surface of the filter 4 such that it corresponds to the wavefront of the received radiation. I.e. the angle of incidence of all the received radiation is almost the same.

REFERENCE NUMERALS 1 optoelectronic sensor
2 reception element
3 reception lens
4 optical filter element
5 first part lens
6 second part lens
7 first surface
8 second surface
9 surface
10 optical filter
11 circuit board
12 cylindrical lens
13 transmission element
14 transmission lens

The invention claimed is:

1. An optoelectronic sensor, comprising:
a reception element,
at least one reception lens, and
an optical filter element,
wherein the filter element is arranged without a gap between a first part lens and a second part lens, with the part lenses forming one of the reception lenses or the reception lens, and with the optical filter element having at least a convex or concave shape and received light beams passing through the filter element at the same angle at every entry point.

2. The optoelectronic sensor in accordance with claim 1, wherein received light beams pass through the filter element at a perpendicular angle at every entry point.

3. The optoelectronic sensor in accordance with claim 1, wherein the reception lens is a cylindrical lens and the filter element is a cylindrical body.

4. The optoelectronic sensor in accordance with claim 1, wherein the first part lens and the second part lens each have different refractive indices.

5. The optoelectronic sensor in accordance with claim 1, wherein the optoelectronic sensor is a sensor element in accordance with the time of flight method.

6. The optoelectronic sensor in accordance with claim 1, wherein the sensor is a laser scanner or a camera.

7. The optoelectronic sensor in accordance with claim 1, wherein a first surface of the first part lens and a second surface of the second part lens each have a planar, convex, or concave surface.

8. The optoelectronic sensor in accordance with claim 1, wherein at least one of the first part lens and the second part lens has a spherical surface.

9. The optoelectronic sensor in accordance with claim 1, wherein the filter element is composed of glass or plastic.

10. The optoelectronic sensor in accordance with claim 1, wherein the filter element is an optical lens.

11. An optoelectronic sensor, comprising:
a transmission element,
at least one transmission lens, and
an optical filter element,
wherein the filter element is arranged without a gap between a first part lens and a second part lens, with the part lenses forming one of the transmission lenses or the transmission lens, and with the optical filter element having at least one convex or concave shape and transmitted light beams passing through the filter element at the same angle at every entry point.

12. The optoelectronic sensor in accordance with claim 11, characterized in that transmitted light beams pass through the filter element at a perpendicular angle at every entry point.

13. The optoelectronic sensor in accordance with claim 11, wherein the first part lens and the second part lens each have different refractive indices.

14. The optoelectronic sensor in accordance with claim 11, wherein the optoelectronic sensor is a sensor element in accordance with the time of flight method.

15. The optoelectronic sensor in accordance with claim 11, wherein the sensor is a laser scanner or a camera.

16. The optoelectronic sensor in accordance with claim 11, wherein a first surface of the first part lens and a second surface of the second part lens each have a planar, convex, or concave surface.

17. The optoelectronic sensor in accordance with claim 11, wherein at least one of the first part lens and the second part lens has a spherical surface.

18. The optoelectronic sensor in accordance with claim 11, wherein the filter element is composed of glass or plastic.

19. The optoelectronic sensor in accordance with claim 11, wherein the filter element is an optical lens.

20. The optoelectronic sensor in accordance with claim 11, wherein the transmission lens is a cylindrical lens and the filter element is a cylindrical body.

21. An optoelectronic sensor, comprising
a reception element,
a reception lens, and
an optical filter element that is arranged between the reception element and the reception lens,
wherein the optical filter element has at least one curved free-form surface so that the received light beams pass through the filter element at the surface of the optical filter element at the same angle at every entry point.

22. An optoelectronic sensor, comprising:
a transmission element,
a transmission lens, and
an optical filter element that is arranged between the transmission element and the transmission lens,
wherein the optical filter element has at least one curved free-form surface so that the transmitted light beams pass through the filter element at the surface of the optical filter element at the same angle at every entry point.

* * * * *